United States Patent [19]

Piety et al.

[11] Patent Number: 5,943,634
[45] Date of Patent: Aug. 24, 1999

[54] VIBRATION DATA ANALYSIS BASED ON TIME WAVEFORM PARAMETERS

[75] Inventors: Kenneth R. Piety; James C. Robinson; Mark W. Slemp, all of Knoxville, Tenn.

[73] Assignee: CSI Technology, Inc., Wilmington, Del.

[21] Appl. No.: 08/645,907

[22] Filed: May 14, 1996

[51] Int. Cl.$^6$ ................................. G01M 7/02
[52] U.S. Cl. ................. 702/56; 364/528.15
[58] Field of Search ............... 364/487, 508, 364/550, 551.01, 551.02, 474.14, 474.16, 528.15; 73/577, 574, 602, 609, 610, 611, 584, 587; 340/680, 683; 702/56

[56] References Cited

U.S. PATENT DOCUMENTS

| | | | |
|---|---|---|---|
| 4,366,544 | 12/1982 | Shima et al. | 364/550 |
| 4,408,285 | 10/1983 | Sisson et al. | 364/508 |
| 4,425,798 | 1/1984 | Nagai et al. | 73/659 |
| 4,429,578 | 2/1984 | Darrel et al. | 73/659 |
| 4,520,674 | 6/1985 | Canada et al. | 73/660 |
| 4,612,620 | 9/1986 | Davis et al. | 364/551 |
| 4,800,512 | 1/1989 | Busch | 364/551.01 |
| 4,831,560 | 5/1989 | Zaleski | 364/551.01 |
| 4,885,707 | 12/1989 | Nichol et al. | 364/551.01 |
| 5,023,824 | 6/1991 | Chadima, Jr. et al. | 364/708 |
| 5,155,659 | 10/1992 | Kunert | 361/380 |
| 5,185,700 | 2/1993 | Bezos et al. | 364/424.04 |
| 5,407,265 | 4/1995 | Hamidieh et al. | 340/680 |
| 5,566,092 | 10/1996 | Wang et al. | 364/551.02 |
| 5,579,232 | 11/1996 | Tong et al. | 364/474.17 |

*Primary Examiner*—Melanie Kemper
*Attorney, Agent, or Firm*—Luedeka, Neely & Graham

[57] ABSTRACT

An efficient vibration data collection, analysis, and storage system automates the analysis of time waveform data and optimizes use of available memory and minimizes data collection time by parameterizing the time domain vibration waveform produced by a vibration transducer attached to a machine. Various parameters are calculated from the time domain waveform and compared to predetermined thresholds or other criteria representative of possible anomalous conditions within the monitored machine. When one or more anomaly criteria are met, an alarm is generated and the system automatically collects, or stores vibration data, which may include both the time waveform and frequency spectrum. Alternatively, the system may be programmed to conduct further analysis of the vibration data during an alarm condition prior to data storage. Preferably, time waveform data is stored only for machines that are in alarm, and the calculated parameters are stored for each machine regardless of the machine's condition. Stored data may be uploaded to a base computer for further analysis and long-term storage. The waveform parameters serve to provide metrics of behaviors in the waveform that are particularly useful to both the data collection technician and the vibration analyst.

24 Claims, 5 Drawing Sheets

VIBRATION DATA ANALYSIS BASED ON TIME WAVEFORM PARAMETERS

TECHNICAL FIELD

The present invention relates to vibration data collection, analysis, and storage systems. More particularly, it relates to a vibration data analysis system for analyzing vibration data in the time domain and generating an alarm when one or more parameters of the time waveform meet established criteria.

BACKGROUND

The use of vibration analysis as a Predictive Maintenance (PDM) tool for monitoring the health of rotating machinery is a well established practice. In general, this process utilizes intelligent data collection instruments that are carried by a technician from machine to machine in accordance with a preprogrammed "route" to acquire the vibration signatures for each machine. A typical route will include a list of machines, test points for each machine, and a specification of how data is to be acquired for each test point. Generally, the vibration data collected consists of the spectral data, obtained using a fast Fourier Transform (FFT). The spectrum is generally broken up into analysis parameters containing the energy in selected frequency or order-based bands and these parameters are checked against alarm limits established for each point. These analysis parameters of the entire spectral data set can be stored in the data collector and later downloaded to a database on a workstation for storage and further analysis.

The spectral data stored typically is average data which is acquired from multiple blocks of data where each block of data is transformed to the frequency domain via FFT and averaged in the frequency domain. The averaged spectral data does not require excessive storage capability relative to the amount of time data required to construct the FFT and hence, can be stored in the portable data collectors which can store average spectral data from a few hundred measurement points. As an example, consider a single measurement point consisting of a 400-line spectra computed from 6 averages. For each spectral block, a time data block consisting of 1024 time data points must be collected. Since the stored average spectral data block is made up of 6 block averages, it requires 6×1024, or 6144 time data points. This is far too much data to store and manage given the number of measurement points that are typically monitored at a given facility on a measurement route.

Although the acquisition of averaged vibration spectral data using portable data collectors in the "route" mode has proven extremely valuable for machinery monitoring in predictive maintenance programs, it is generally acknowledged that time data would provide highly useful data to assist in the interpretation of certain classes of problems commonly experienced in machinery. However, saving all of the time data used to construct the spectral data is simply too burdensome to be considered a realistic option.

What is needed, therefore, is an efficient and convenient methodology for computing a few key parameters which characterize the time data in a manner which enhances the spectral data that is routinely acquired for machine health or condition monitoring. These time waveform parameters can be checked against alarm limits to alert the technician that unusual conditions in the time waveform have been detected. This automatic prompting of the technician can enable further investigation of the possible causes and can automatically trigger storage of the time waveform data for further analysis by an analyst at the analysis workstation.

In general, the evaluation of time waveform data from vibration sensors has been done by an experienced human eye, if done at all. The systematic analysis of vibration time waveforms by the computer has not been done except to look at overall amplitude type parameters. The approach described herein is to look for waveform behaviors that are indicative of various classes of faults by calculating a set of waveform parameters that are metrics of the possible behaviors in the waveform data. These waveform parameters are quantitative and can be used to automate the analysis of waveform data and to determine the direction and rate at which changes are occurring.

SUMMARY

The present invention provides a vibration data analysis system for analyzing digital time domain vibration data (time waveform) generated by a machine. The vibration data includes positive peaks, negative peaks, DC components, and sinusoidal components having corresponding amplitudes. The system includes a data processor having a time waveform analyzer that selectively digitally analyzes the digital time domain vibration data to produce a plurality of time domain parameters for alarming. The data processor also includes a comparator for comparing at least one of the plurality of time domain parameters to one or more predetermined criteria. An alarm is produced when the criteria is met.

To provide for storage of vibration data, the system may include gating means for storing vibration data based on an analysis of the digital time domain vibration data. If a parameter is in alarm, the system may be programmed to automatically store at least the time waveform. Alternatively, two or more alarms are required to store vibration data. An FFT of the time waveform may be performed and the resultant frequency spectrum stored regardless of whether a parameter of the time waveform is in alarm. Further, the time waveform that is used to obtain the spectrum may be different than the time waveform that is stored. For example, the frequency spectrum may be obtained from a time waveform measured in velocity units while the time waveform that is actually stored is one measured in acceleration units.

The comparator may be configured to compare a variety of time domain parameters to predetermined criteria. For example, the comparator may be configured as a maximum peak comparator for comparing the amplitudes of positive and negative peaks to predetermined criteria. As another example, the comparator may be configured to compare a symmetry factor to predetermined criteria. Other parameters may include maximum peak-to-peak, crest factor, kurtosis, impact parameter A, impact parameter B, average slope parameter, maximum jerk parameter, bearing looseness parameter, peaks above RMS, points above RMS, peaks/points ratio, zero crossings/points ratio, peak symmetry, absolute symmetry, shape symmetry, skewness, nonsynchronous residual factor, synchronous residual factor, DC shift, DC drift, off-center rotation parameter, sinusoidal parameter A, sinusoidal parameter B, sinusoidal parameter C, and Gaussian distribution deviation.

The data processor may include an FFT analyzer for receiving a first digital time waveform and analyzing the first digital time waveform in the frequency domain. In this embodiment, a selector is used to select between the first digital time waveform or a second digital time waveform that is different than the first time waveform. The selected time waveform is then digitally analyzed by the time waveform analyzer to produce a plurality of time domain parameters for alarming.

Also provided is a method of collecting, analyzing, and storing vibration data generated by a machine. The method includes the steps of producing an analog vibration signal in the form of a time domain waveform which corresponds to vibrations generated by the machine. The time domain waveform is conditioned to produce a conditioned time domain waveform. The conditioned time domain waveform is digitized to produce a first digital waveform. The first digital waveform is analyzed by determining at least one parameter of the first waveform, determining one or more criteria corresponding to the at least one parameter, comparing the criteria to the at least one parameter, and producing an alarm when the at least one parameter meets the criteria.

BRIEF DESCRIPTION OF THE DRAWING

The preferred embodiments of the invention will now be described in further detail with reference to the drawings wherein like reference characters designate like or similar elements throughout the several drawings as follows.

DETAILED DESCRIPTION OF PREFERRED EMBODIMENTS

Figure 1:
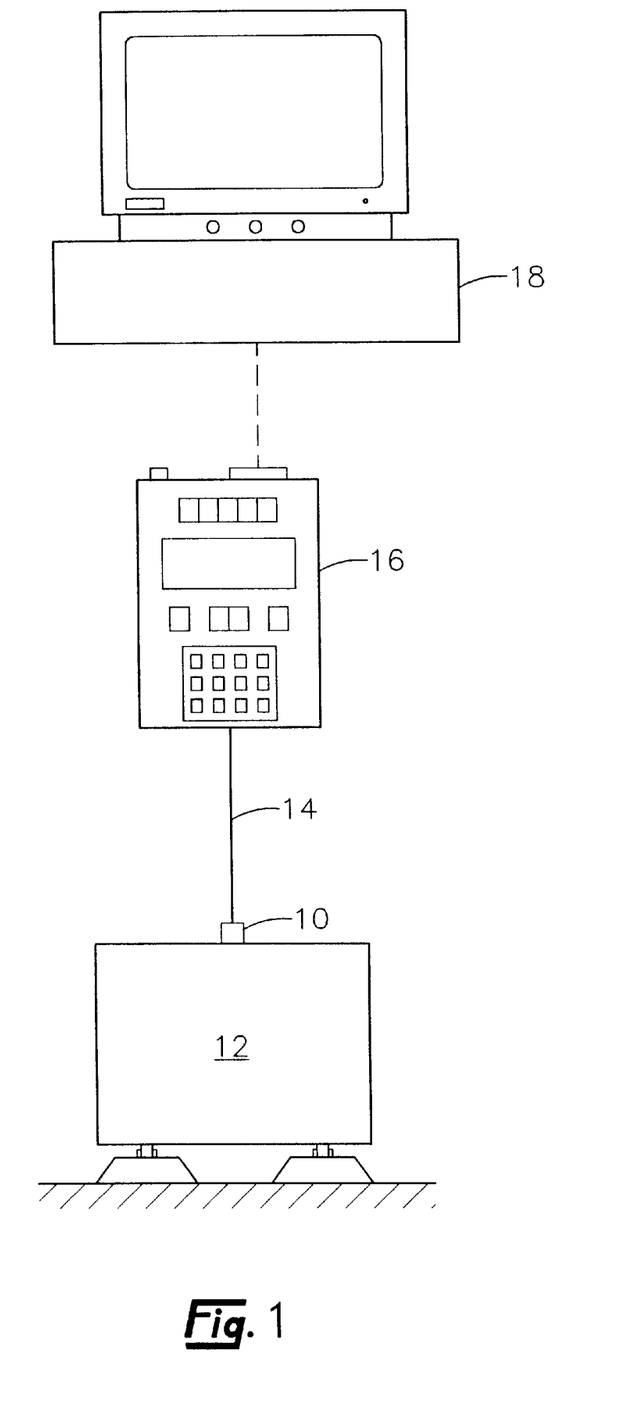
FIG. 1 is a diagrammatical drawing showing a data collector interconnected to collect and store vibration data from a machine and to provide stored data to a base computer.

In accordance with a preferred embodiment of the present invention, an apparatus for efficient storage of vibration data in the field is illustrated in block diagram form in FIG. 1. During vibration data collection and storage, a vibration transducer, such as an accelerometer 10, is attached to a machine 12. Vibrations generated by the machine 12 are sensed by the accelerometer 10 and an analog voltage signal representative of the sensed vibrations is output on line 14. A data collector 16, such as a CSI 2115 or 2120 portable data collector, collects the analog signal and stores selected vibration data in accordance with its programming. The stored vibration data may be downloaded to a base computer 18 for long-term storage and further analysis. The base computer 18 may also function to provide programming to the data collector 16.

Figure 2:
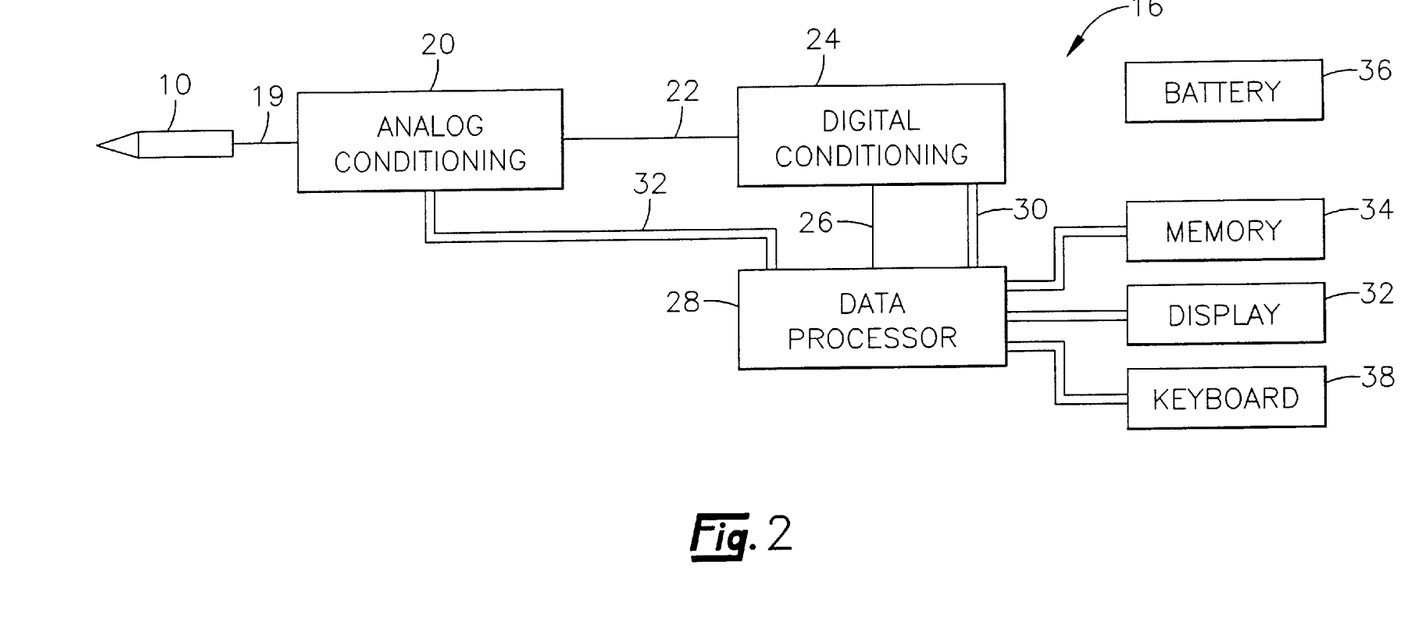
FIG. 2 is a simplified block diagram of a data collector.

A detailed description of a field data collector 16 can be found in U.S. patent application Ser. No. 08/355,208, filed on Dec. 9, 1994, and entitled Hand Held Data Collector and Analyzer System, the entire contents of which is hereby expressly incorporated herein by reference. FIG. 2 illustrates a simplified block diagram of a field data collector 16. An accelerometer 10 or other vibration transducer produces an analog vibration signal that is supplied through line 19 to the analog conditioning circuit 20. The term "line" as used herein should be regarded as both singular and plural. Depending on its context, "line" may refer to a single wire or electrical path, or it may collectively refer to a plurality of wires or electrical paths. Input control, analog filtering, analog integrating, amplification and DC offset functions are performed in the analog conditioning circuit 20 to produce a conditioned analog signal on line 22 which is supplied to a digital conditioning circuit 24. The conditioned analog signal is converted to a digital signal within digital conditioning circuit 24, and preferably, during the digital signal conditioning, the analog signal is Sigma Delta modulated, noise shaped, quantized to a digital signal, digitally filtered and digitally decimated. The conditioned digital signal is supplied through line 26 to a data processor 28, which is preferably a number of processors. The data processor 28 controls the digital conditioning circuitry through line 30 and controls the analog conditioning circuitry through line 32. Also connected to the data processor 28 are a memory 34, a display 32 and a keyboard 38. Preferably, the memory 34 includes RAM, ROM and a PCMCIA external memory card. The display 32 preferably is a luminous display manufactured by Samsung as model number 87-203-0123. The keyboard 38 is preferably a membrane matrix-type keyboard.

Also shown in FIG. 2 is a battery 36 which powers all of the components shown in FIG. 2. The battery 36 is physically connected to power all of the components shown in FIG. 2.

Because several machines 12 are typically monitored by the data collector 16 in accordance with a pre-programmed route, vibration data storage is preferably selective. Otherwise, the data storage process requires an undue amount of time and the memory capacity of the data collector 16 could be exceeded. Therefore, in the interests of maximizing efficiency and optimizing use of available memory within the data collector 16, it is preferable to store only data which will yield desired information about the machine 12.

Typically, vibration data is collected to determine whether the machine 12 is healthy, or whether the machine 12 is operating with a fault or pre-fault condition as indicated by its vibration characteristics. The data collector 16 can be programmed to integrate the acceleration time waveform produced by the accelerometer 10 and then perform a fast Fourier transform (FFT) on the resulting velocity time waveform to produce a frequency spectrum. Preferably, a time series of FFT's are averaged to enhance the stored data. At the user's option, the frequency spectrum is then displayed on the data collector's display. While samples of the time domain waveform can be stored along with the frequency spectrum, this is generally not desirable unless it is known that the time waveform is needed for further analysis. If the time waveform were stored for every measurement point for every machine 12, the memory capacity of the data collector 16 would quickly be exceeded.

Inefficiencies and uncertainties in the data collection and storage process are minimized with the present invention by programming the data collector 16 to function like a "gate in the field" where vibration data (i.e., time waveform data or spectral data, or both) is automatically stored (gate open) only when the data collector 16 determines that vibration data should be stored. When the data collector 16 determines that no data should be stored (i.e., no anomalous vibration characteristics exist), the gate is closed and little or no data is stored in the data collector's memory. In a preferred embodiment, the gate opens to store data when the data collector 16 determines the likely presence of an anomalous condition within the machine 12. For clarity, it should be noted that the data collector 16 can be programmed to store spectral data regardless of alarm conditions, or the data collector 16 could be programmed to store both spectral and time waveform data only when an alarm condition exists.

The process by which the data collector 16 opens and closes the data storage gate should involve an analysis of the time domain vibration waveform to ascertain the values of one or more of a plurality of time domain parameters. The calculated parameter values are compared to parameter thresholds or other criteria representative of anomalous conditions. When one or more of the parameters meet the anomaly criteria, an alarm is generated to indicate the likely presence of a fault or pre-fault condition within the monitored machine 12, or possibly, erroneous data acquisition conditions were employed.

When a time domain waveform parameter is in alarm, the gate opens to store the complete frequency spectrum (if not already stored), or the vibration time waveform data, or both. Alternatively, further analysis of the time waveform data and/or spectral data may be performed to obtain more information regarding the condition of the machine 12. For example, a peak vibration analysis of the type disclosed in U.S. patent application Ser. No. 08/555,296, filed Nov. 8, 1995, and entitled "Machine Fault Detection Using Vibration Signal Peak Detection", may be performed by the data collector 16 when an alarm condition is signaled. Based on the results of this post-alarm analysis, vibration data may be stored, or it may be determined that no vibration data should be saved. If no alarm conditions exist, then preferably only the parametric values of the vibration time waveform (along with the frequency spectrum if desired) are stored and the gate is closed to conserve available memory. Stored data and parameters can be downloaded to the base computer 18 for further analysis and long-term storage.

The data collector 16 also has the ability to utilize different time waveforms for performing FFT and time waveform analysis. For example, for a particular machine 12 the data collector 16 can be used to perform an FFT (frequency analysis) of the time waveform in velocity units using an upper frequency of 1.0 Khz while an acceleration waveform with an upper frequency of 5.0 Khz is utilized for time waveform analysis. As a default, the data collector 16 uses the same waveform for both time waveform analysis and FFT analysis if the user does not specify otherwise.

The following Table 1 identifies various waveform behaviors and corresponding parameters which may be used to characterize the behaviors.

TABLE 1

| Waveform Behavior | Parameter |
| --- | --- |
| 1. Spiking | a. Maximum Peak |
| Repetitive | b. Maximum Peak-to-Peak |
| Random | c. Crest Factor |
| | d. Kurtosis |
| | e. Impact Parameter A (IMPRAT_A) |
| | f. Impact Parameter B (BRGFCT_B) |
| | g. Average Slope Parameter (ASLPCHG) |
| | h. Maximum Jerk Parameter (MAXJRK) |
| | I. Bearing Looseness Parameter (BRGPAR) |
| | j. Peaks above RMS (# or %) |
| | k. Points above RMS (# or %) |
| | l. Peaks/Points Ratio |
| | m. Zero Crossings/Points Ratio |
| 2. Symmetry | a. Peak Symmetry (PS) |
| | b. Absolute Symmetry (AS) |
| | c. Shape Symmetry (SS) |
| | d. Skewness (SKEW) |

TABLE 1-continued

| Waveform Behavior | Parameter |
| --- | --- |
| 3. Repetitiveness/ | a. Nonsynchronous Residual Factor |
| Randomness | b. Synchronous Residual Factor |
| Nonsynchronous | |
| Synchronous | |
| 4. Discontinuities | a. DC Shift |
| 5. Drifts | a. DC Drift |
| 6. Sinusoidal Content | a. Off-Center Rotation Parameter (MAXDELC) |
| | b. Sinusoidal Parameter A (CLUAREA) |
| | c. Sinusoidal Parameter B (SINFAC) |
| | d. Sinusoidal Parameter C |
| 7. Changes in Amplitude Probability Density (APD) | a. Gaussian Distribution Deviation |

Following are descriptions of the various alarm parameters shown in Table 1 that characterize specific behaviors in the time domain waveform. The data collector 16 is preferably programmed to perform all of the below listed alarm parameter calculations and compare them to predetermined criteria. Thus, the present invention provides a data collector 16 capable of determining a plurality of waveform behaviors based on the calculated values of a plurality of waveform parameters. For example, when crest factor, kurtosis, and bearing looseness parameters are all in alarm, it is known that spiking behavior is present in the time waveform. Likewise, when peak symmetry and shape symmetry are each in alarm, the waveform is known to be exhibiting anomalous symmetry behavior.

The general waveform behaviors shown in Table 1 are indicative of specific classes of machinery faults, or due to erroneous data acquisition conditions. For example, spiking usually results from sudden metal-to-metal contact in vibration signatures, such as occurs from bearing defects or chipped gear teeth. Asymmetric waveforms result from non-linear fault modes, where motion in one direction is restricted by forces, physical restraints, or non-uniform system flexibilities, such as occurs due to misalignment or cracks in the supporting members. Sinusoidal behavior that is synchronous is often related to unbalance conditions. There are more than six different faults which show up at 1×RPM in the frequency spectrum. However, the waveform data is key to allowing the analyst to differentiate between these conditions in some cases. The parameters shown in Table 1 are only some of the metrics that can be devised to measure the behaviors outlined. Other parameters could be devised to measure the same behaviors.

The parameter calculation routines are preferably stored permanently in the non-volatile memory of the data collector 16, whereas the predetermined criteria are preferably part of the data in the route, but the criteria may also be supplied manually by the user. It should be noted that, although not required, it is preferable to program the data collector 16 to zero the DC or average component of the time domain waveform prior to calculating the parameters.

Routines are provided for calculating the following parameters:

1. Maximum Peak (positive or negative)

This parameter represents the amplitude that is furthest from zero, either positive or negative. It is used to determine when anomalous impacting is occurring within the machine 12, such as might result from bearing or gear tooth defects. The anomaly criteria for this parameter will vary depending on the particular type of machine. A threshold impact of 1.5 g's has been found to be an acceptable failure criteria for most machines.

2. Maximum Peak-to-Peak

This parameter is determined by summing the greatest positive peak plus the greatest negative peak occurring within a given time period. Preferably, this parameter does not require that the negative peak be attached directly to the positive peak. Anomaly criteria will vary depending on the machine being monitored. In most cases, a threshold peak-to-peak value of 3 to 10 g's will be fairly indicative of a likely fault or pre-fault condition within the machine.

3. Peaks Above RMS

As the name implies, this parameter looks at peaks above RMS. The value units of this parameter can be either a number or a percentage of peaks above RMS. A large percentage or number of such peaks can indicate impacting.

4. Points Above RMS

This parameter looks at points above RMS. Used to indicate impacting or sinusoidal behavior, this parameter can also be evaluated in total points or percentage of points.

5. Peaks/Points Ratio

This spiking parameter looks at the ratio of the total peaks to total points within a sample of the waveform.

6. Zero Crossings/Points Ratio

This parameter calculates the ratio of the total number of zero crossings in a sample of the waveform to the total number of points within the sample.

7. Crest Factor

The crest factor is the maximum peak divided by the RMS of the signal over the predetermined time interval. This parameter might be said to represent a general measure of the impacts within the time waveform. For a normal, healthy machine, the crest factor will typically be below 2.5 g's. An increase in the crest factor over time means that the time waveform has peaks resulting from impacts, which typically indicates looseness within the machine. When the crest factor goes down, it means that periodic content is increasing, which is typically indicative of balancing or alignment problems.

8. Kurtosis

This parameter is derived from the second, $M_2$, and fourth, $M_4$, moments of the time waveform as given by the following equations:

$$KURTOSIS = \frac{M_4}{M_2^2}, \qquad (1)$$

$$M_4 = \frac{1}{n}\sum_{i=1}^{n}(X_i - \overline{X})^4, \qquad (2)$$

$$M_2 = \frac{1}{n}\sum_{i=1}^{n}(X_i - \overline{X})^2, \qquad (3)$$

where:

$X_i$ represents the amplitude of the waveform at each sampled point;

$\overline{X}$ represents an average of sampled points within a waveform sample; and n represents the total number of sampled points occurring within the sample.

9. Symmetry Factor

Basically, the test for symmetry (sometimes referred to as skew) looks to determine the extent of similarity between the negative portion of the signal and the positive portion of the signal. Highly asymmetric waveforms indicate that nonlinear system response is occurring. Typically, this behavior appears as a result of alignment problems, resonance problems, and directional flexibility which are due to looseness or cracks. While a high degree of symmetry does not guarantee a healthy machine, a low symmetry usually does indicate a potential problem. One symmetry parameter is calculated by determining the ratio of peak-to-average in the positive domain to the peak-to-average in the negative domain.

10. Peak Symmetry (PS)

This parameter looks at the ratio of the amplitudes of positive peaks (PK+) to average positive amplitude (AVE+), and the ratio of the amplitudes of negative peaks (PK−) to average negative amplitude (AVE−), as given by the equations:

$$PS = \frac{PK+}{AVE+}, \text{ and } PS = \frac{PK-}{AVE-}. \qquad (4)$$

11. Absolute Symmetry (AS)

Figure 4:
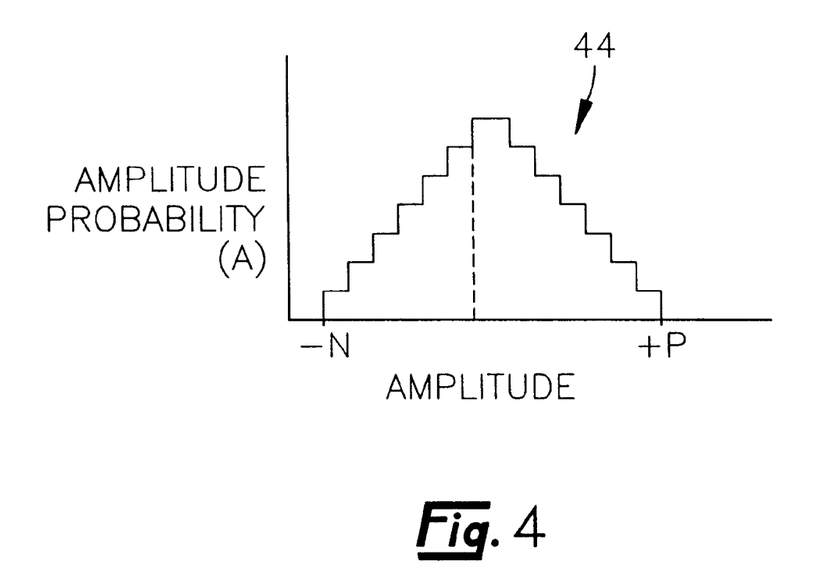
FIG. 4 is a time waveform histogram used for determining a shape symmetry parameter.

This parameter is calculated by determining a histogram of amplitude probability ($A_i$ being the probability of this amplitude) within the waveform as determined by summing the number of samples located in N equal amplitude regions between the smallest value and the largest value. A sample histogram 44 is shown in FIG. 4. Absolute symmetry (AS) is determined from the histogram 44 by the equation:

$$AS = \sum_{i=1}^{P} A_i - \sum_{i=-1}^{-N} A_i \qquad (5)$$

where:

P is the number of histogram intervals greater than the mean value; and

N is the number of histogram intervals less than the mean value.

The zero$^{th}$ interval is the one enclosing the mean value.

12. Shape Symmetry (SS)

From the histogram 44 of FIG. 4, shape symmetry (SS) is given by the equation:

$$SS = \sum_{i=1}^{\text{Max of } N \text{ or } P} |A_i - A_{-i}|. \qquad (6)$$

13. Skewness (SKEW)

To determine skewness, the second and third central moments ($M_2$ and $M_3$, respectively) of points within the waveform are determined from the equations:

$$M_2 = \frac{1}{n}\sum_{i=1}^{n}(X_i - \overline{x})^2, \text{ and } M_3 = \frac{1}{n}\sum_{i=1}^{n}(X_i - \overline{X})^3. \qquad (7)$$

Skewness (SKEW) is calculated from the second and third moments ($M_2$, $M_3$) by the following equation:

$$SKEW = \frac{M_3}{M_2^{\frac{3}{2}}}. \qquad (8)$$

14. Gaussian Distribution Deviation

This parameter is a measure of the deviation of the time data from a normal or gaussian distribution. A gaussian distribution of amplitude values within the time waveform is considered a normal distribution and deviations from a gaussian distribution may indicate a potential problem. The calculation will normally be: (a) for a time signal which has been low pass filtered in the vicinity of 500 to 1,000 Hz; and (b) for the time signal high passed at the same frequency with which it was low passed. The procedures to acquire this parameter are:

(1) Low pass filter the time waveform.
Steps:
Low pass the time waveform at $f_{REF}$;
Construct the amplitude probability histogram;
Normalize histogram to acquire the probability density function P(x), where x is the amplitude value less the mean amplitude value; and
Construct a new probability density function Y(z), where $$Y(Z) \equiv \log_{10} P(x) \qquad (9)$$

and $$z \equiv x^2. \qquad (10)$$

If P(x) is gaussian, then Y(z) will be a triangle whose slope is negative (−) in the positive z domain and positive (+) in the negative z domain. The "slopes" are the parameters to be trended and alarms generated therefrom.

(2) High pass signal at $f_{REF}$.
Steps:
Proceed to acquire the slopes for Y(z) as described above; and
Trend and alarm off of the slope values. If signals are gaussian, the absolute slope value will be 1.0.

15. Impact Parameter A (IMPRAT_A)

As defined in Equation (11) below, this parameter takes the average of the highest four impacts (IMPAVG parameter) and divides the average by an absolute $\overline{X}$, where absolute $\overline{X}$ is the average value of the absolute value of all the data points in the data set.

$$IMPRAT\_A = \frac{IMPAVG}{|Xbar|} = \frac{\frac{\sum_{i=1}^{4} M_i}{4}}{\frac{\sum_{i=1}^{n} |X_i|}{n}} \qquad (11)$$

where:
$M_i$ represents maximum impacts;
$X_i$ represents impacts generally; and
n represents number of data points.

This parameter will pick out moderate impacts in a relatively smooth time waveform, and it might be said to be a measure of the distinctiveness of the impacts. For most machines, any values above 10 are indicative of a potential problem, and a high value of this parameter alone seems to indicate early stage bearing defects. This parameter, therefore, can be used to prevent severe impacting and excessive degradation of the bearing components.

16. Impact Parameter B (BRGFCT_B)

This parameter incorporates the IMPAVG parameter, which is the average of the four highest impacts, and the IMPRAT_A parameter, and is defined by the following equation:

$$BRGFCT\_B = \qquad (12)$$

$$\frac{IMPAVG - IMPRAT\_A}{IMPAVG + IMPRAT\_A} = \frac{\left[\frac{\sum_{i=1}^{4} M_i}{4}\right]^2 \left[\frac{\sum_{i=1}^{n} |X_i|}{n}\right]^{-1}}{\left[\frac{\sum_{i=1}^{4} M_i}{4}\right] + \left[\frac{\sum_{i=1}^{4} M_i}{4}\right]\left[\frac{\sum_{i=1}^{n} |X_i|}{n}\right]^{-1}}.$$

The BRGFCT_B parameter detects instances where the two component parameters (IMPAVG and IMPRAT_A) are each present at a significant level, but may or may not be at high enough levels to individually produce an alarm condition. This is a more general parameter that indicates the presence of significant, yet distinct, impacts. A value greater than 2.5 is flagged as indicative of a potential problem.

17. Average Slope Parameter (ASLPCHG)

This parameter gives the average change in slope for a given set of time waveform data and is defined by the following equation:

$$ASLPCHG = \frac{\sum_{i=2}^{n} \frac{|X_i - X_{i-1}|}{T_i - T_{i-1}}}{n-1} \qquad (13)$$

where:
$T_i$ represents time at which sample $X_i$ was acquired.

Equation (13) provides a general measure of how high frequency components are affecting the machine. Values greater than 250 are considered to be significant and indicative of a potential problem within the machine. This parameter detects bearing looseness and electrical conditions which often exhibit high frequency energy without significant impacting.

18. Maximum Jerk Parameter (MAXJRK)

This parameter, as defined by Equation (14) below, calculates the maximum instance of a jerk, where jerk is generally defined to be the rate of change of acceleration.

$$MAXJRK = \text{Max}\left[\frac{|X_n - X_{n-1}| + |X_{n+1} - X_n|}{T_{n+1} - T_{n-1}}\right] \qquad (14)$$

where:
$T_i$=the time at which sample $X_i$ was acquired; and provided that:

$$(X_n - X_{n-1})(X_{+1} - X_n) < 0.$$

Equation (14) is similar to the ASLPCHG parameter, but it searches for more isolated instances, possibly locating transient spikes in the time waveform that would otherwise be averaged out. For purposes of calculation of this parameter, a jerk is defined as the sum of the rates of change of the acceleration on each side of a change in slope. This parameter cannot be used directly in calculating severity since a machine cannot actually experience jerk or anything else beyond acceleration, but it does indicate the presence of a significant impact. Values above 25 are flagged as indicative of a potential problem.

19. Bearing Looseness Parameter (BRGPAR)

This bearing looseness parameter functions mainly to detect bearing defects on slow speed machines. It is defined by the following equation:

$$BRGPAR = \frac{IMPRAT \cdot \frac{\sum_{i=1}^{n}|X_i|}{n}}{ASLPCHG} = \frac{\frac{\sum_{i=1}^{4}M_i}{4}}{\frac{\sum_{i=2}^{n}|X_i - X_{i-1}|}{T_i - T_{i-1}}} \quad (15)$$

where:

$T_i$=time at which sample $X_i$ was acquired.

This parameter will generally indicate an alarm condition only when there is moderate impacting within the machine 12 with significant RMS energy, yet low average change in slope. This is commonly the case in slower speed machinery where the slow speed machine does not generate a tremendous amount of high frequency energy as compared to a fast speed machine. The impacts are also generally lower, but this parameter functions well without generating nuisance false alarms. Values above 1.0 are considered indicative of a potential problem.

20. Off-Center Rotation Parameter (MAXDELC)

This parameter is defined by the following equation:

$$MAXDELC = Max\,[C_j - \bar{X}] \quad (16)$$

where:

$$\bar{X} = \frac{\sum_{i=1}^{n} X_i}{n} \text{ and } C_j = \frac{\sum_{i=1}^{10} X_{i-j}}{10} \text{ for } j = \frac{n}{10}. \quad (17)$$

This parameter utilizes values that are calculated by averaging the time waveform into small clusters. If these averages are away from the origin (i.e., approximately $\bar{X}$), then this parameter indicates sinusoidal type motion where the mass is most likely trying to rotate away from its designed center, as in a case of imbalance. If a bearing defect or looseness alone were present, there is no reason why the cluster averages would be away from the origin. Values above 0.5 are flagged as potentially problematic.

21. Sinusoidal Parameter A (CLUAREA)

This is another parameter that screens for sinusoidal type motion and is given by the following equation:

$$CLUAREA = \sum_{i=2}^{\frac{n}{10}} \left| \frac{C_i + C_{i-1}}{2} \right| \cdot \Delta \quad (18)$$

where:

$\Delta$ represents the sampling interval between two consecutive points $(T_i - T_{i-1})$.

The parameter of Equation (18) looks at the total area under the curve generated by the cluster averages. This parameter detects sinusoidal motion with a slower frequency and a lower amplitude value than does the MAXDELC parameter since MAXDELC is configured to detect higher amplitudes, which may have little area under its cluster curve due to the higher frequency. Values above 4 are flagged as potentially indicative of a machine problem.

22. Sinusoidal Parameter B (SINFAC)

The purpose of this parameter is similar to that of the BRGFCT_B parameter, but for sinusoidal motion. It considers both MAXDELC and CLUAREA, and instances where one or both are significant are flagged. The following equation defines the SINFAC parameter.

$$SINFAC = \frac{CLUAREA - MAXDELC \cdot 8}{CLUAREA + 8 \cdot MAXDELC} \quad (19)$$

23. Sinusoidal Parameter C

Figure 3:
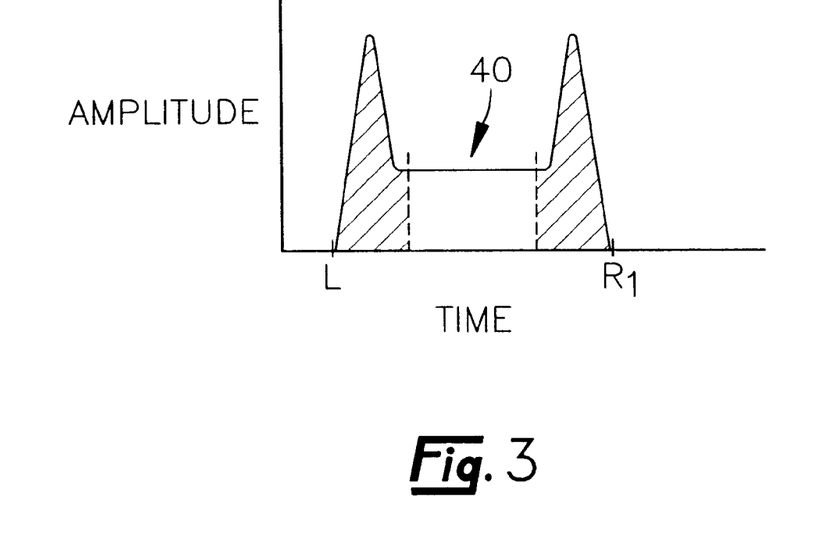
FIG. 3 is a sample graph of a portion of a time waveform.

This parameter measures sinusoidal behavior by determining the number or percentage of points outside of a range of an average of all points ($\bar{X}$). As illustrated in FIG. 3, if $R_1$ and L represent points along the time waveform as shown, a variance (R) is determined by the equation:

$$R = 0.25(R-L). \quad (20)$$

The number of points that lie outside the range $$\bar{X} \pm R \quad (21)$$

indicated generally at 40, provides a measure of sinusoidal behavior within the waveform.

24. DC Shift Parameter (DCSHIFT)
    DC Drift Parameter (DCDRIFT)

Typically, the DC average value of the time waveform should vary little with time and should vary in a random fashion. However, this will not be true when sensor problems or mounting problems exist. These types of faults may cause the average DC to make abrupt changes or to drift steadily in one direction during data acquisition. This should be detected and brought to the technician's attention to prevent erroneous data from being collected and thus, wasting both the data collector and the analyst's time and resources.

To calculate these DC variation parameters, first determine the number of positive ($P_V$) and negative extreme ($N_V$) values in the signal and calculate an average from the equation:

$$K = \frac{P_V + N_V}{2} \quad (22)$$

Average DC values for these subsets of the waveform are determined by the equation:

$$DC_j = \frac{1}{S}\sum_{i=1}^{S} X_i + (j*S) \quad (23)$$

where:

$S = K/K_{DIV}$; and $K_{DIV}$ may be any integer between (5, 10).

DC Shift and DC Drift are then calculated by the following equations:

$$DCSHIFT = Max\frac{DC_{i+1} - DC_i}{\frac{RMS}{10}} \quad (24)$$

$$DCDRIFT = \frac{DC_{K_{DIV}} - DC_0}{\frac{RMS}{10}} \quad (25)$$

Equation (25) above is true if all $DC_{i+1} - DC_i$ are changing in one direction only; otherwise, DCDRIFT=0.

25. Nonsynchronous Residual Factor

This parameter and its companion parameter, Synchronous Factor discussed below, provides a general measure of repetitiveness/randomness within the waveform. A time waveform is collected for five to ten revolutions of the machine and synchronously averaged to obtain an average revolution. The average revolution is subtracted from the waveform data in a synchronous manner, and an RMS of the total residual data (difference between instantaneous waveform and averaged waveform) is calculated. The nonsynchronous residual factor is calculated as the ratio of RMS of total residual to RMS of the average revolution (AveRev), as given by the following equation:

$$\frac{RMS \text{ of Total Residual}}{RMS \text{ of AveRev}}. \tag{26}$$

Values below 0.1 are considered highly repeatable, while values above 0.5 are not considered very repeatable.

26. Synchronous Residual Factor

The synchronous residual factor is the inverse of nonsynchronous residual factor, as given by the following equation:

$$\frac{RMS \text{ of AveRev}}{RMS \text{ of Total Residual}}. \tag{27}$$

As this parameter varies from 0.0 to 1.0, this indicates more repeatable behavior in the waveform.

Figure 5:
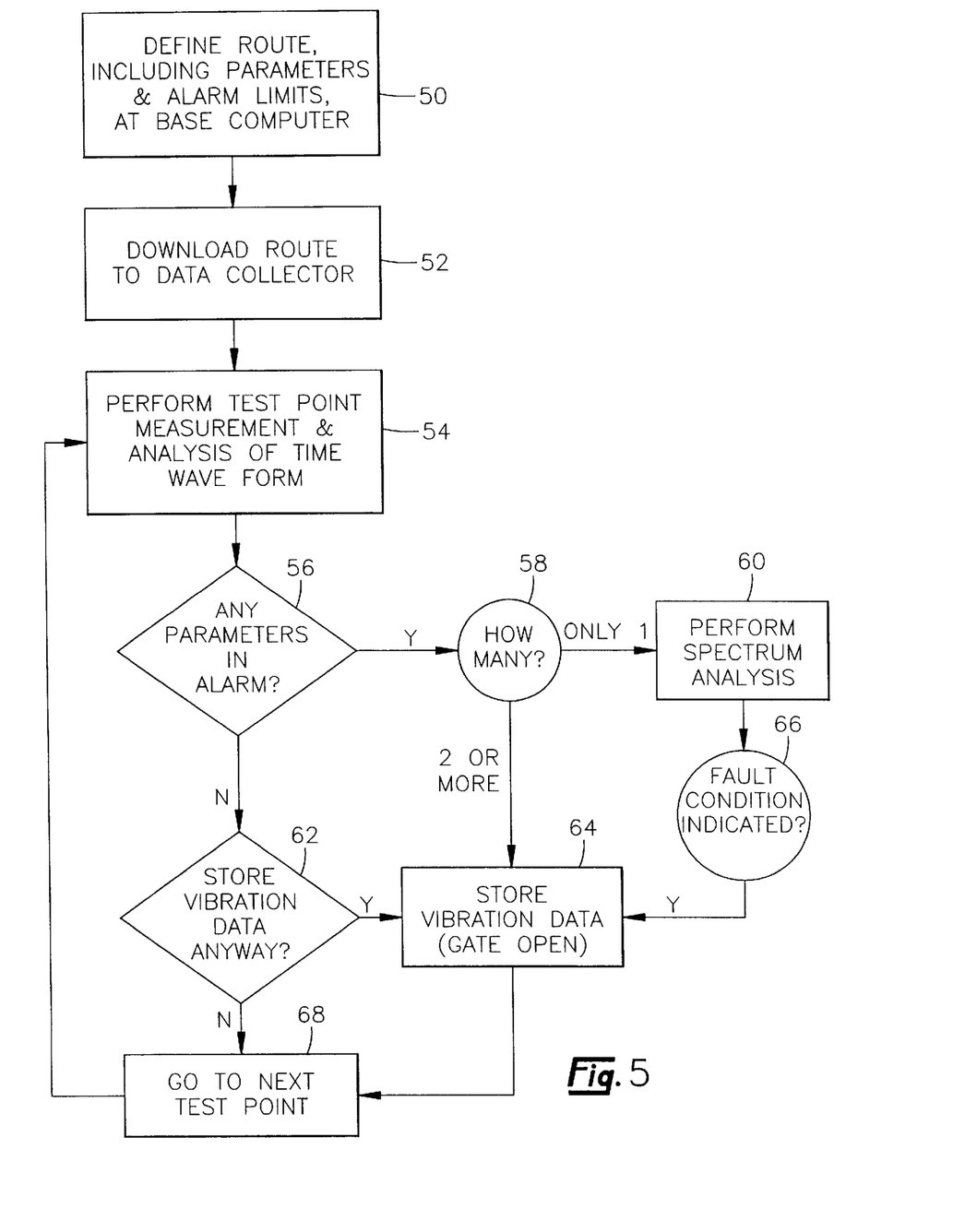
FIG. 5 is a flow diagram of a vibration data collection and storage process where no FFT is performed or stored unless a time waveform parameter is in alarm.

In a typical operation as illustrated in the flow diagram of FIG. 5, a data collection route is defined at a base computer 18, as indicated at block 50. The predefined route is downloaded and stored in the collector's memory 34 (block 52) to instruct the data collector 16 to do various things. The route will typically include a list of machines 12, and for each machine 12 in the list a number of test points will be specified. For each test point, various set-up and data storage parameters are listed, including which ones of the alarm parameters should be calculated and the criteria to which they are to be compared. Also defined are such things as the type of sensor to be used, the preferred units, the frequency range of interest, the type of data to be displayed, the specific data to be stored under a given condition of alarm, and other information associated with the measurement point, such as the identity of the machine, the identity of the measurement point, a description of the measurement point, the date and time, and other such information. In addition, the downloaded information specifies which waveform parameters are to be calculated for this measurement location from the larger set available as well as the alarm criteria appropriate to this location.

A technician conducts vibration measurement, analysis and storage in accordance with the route, using the data collector 16 to measure machine vibrations and to perform time waveform analysis at each test point (block 54) to determine if alarm conditions are present in the time waveform (block 56). The collection of additional vibration data may depend on how many of the time waveform parameters are determined to be in alarm (block 58). For example, when only one of the alarm parameters previously described indicates the existence of an alarm condition, the set-up parameters may instruct the data collector 16 to do nothing (i.e., keep data storage gate closed) unless two or more parameters are in alarm (block 64) in which case the data storage gate opens to store vibration data. Alternatively, when a single alarm parameter indicates a possible machine fault, the set-up parameters may instruct the data collector 16 to perform an FFT of the time waveform and to conduct an analysis of the resultant frequency spectrum (block 60) to obtain more information relating to the potential machine fault. If the results of the spectrum analysis indicate the likely presence of a fault condition (block 66), the data collector 16 automatically "opens the gate" (block 64) for storage of vibration time waveform and/or spectrum, or parts thereof. The technician then follows the route to the next test point (block 68) and repeats the measurement, analysis and storage process.

Figure 6:
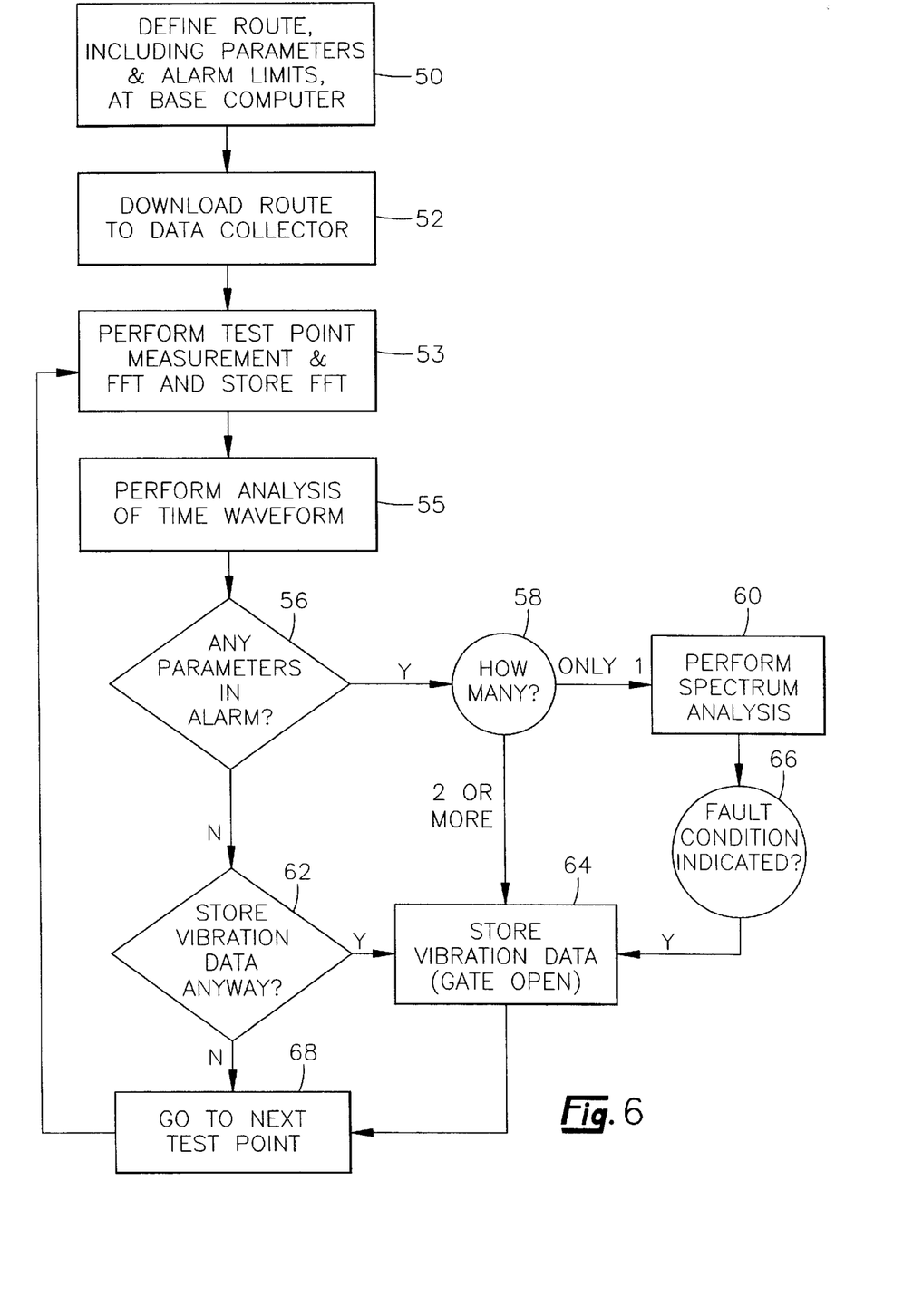
FIG. 6 is a flow diagram of a vibration data collection and storage process where an FFT is performed and stored regardless of whether a time waveform is in alarm.

The flow diagram of FIG. 6 illustrates an alternative data collection and storage operation to that of FIG. 5. In the operation of FIG. 6, an FFT is obtained and stored (block 53) regardless of whether the time waveform is stored. An analysis of the time waveform (block 55) is then performed. Alternatively, an FFT can be obtained and stored after time waveform analysis has commenced.

By reference to the above described time waveform parameter alarms, it is appreciated that distinct advantages are realized by parameterizing the vibration time waveform, both in terms of the concept of alarming on one or more of a plurality of parameters, and in terms of the specific advantages of the specific parameters. For example, time waveform parameterization and alarming provides a quantitative evaluation of the acceptability of waveform data. This means that any user will get the same results independent of human judgment. This both saves time during analysis and gives quantities which can be trended over time to determine whether the deviations in the parameters are increasing and at what rate. Thus, this ability to automate the analysis of time waveform data is not limited to data collector applications.

In cases where there are no limitations due to storage being available, time waveform data can be collected and stored at all points. In this case, the automated analysis of the waveform behaviors as determined from a plurality of parameters can be performed at the analysis workstation.

The time waveform data that is acquired can be the time waveform corresponding to the FFT spectrum, or it can be specified to be collected with different acquisition parameters including the units, frequency-based or ordered-based sampling rates, the maximum frequency, and the number of time points stored. This is an important advantage because it is common practice to collect the spectrum in velocity units, but to collect the time waveform in acceleration units. Furthermore, it is common to acquire the time waveform with a higher frequency range to avoid attenuating impacting events. If the time waveform were always tied to the setup for spectral data collection, the optimum setup for one of the two would be compromised or additional data collection points would have to be defined which would even further increase storage requirements.

Finally, alarming on the vibration time waveform can yield different information as compared to alarming on the frequency spectrum. Many vibration characteristics, such as spiking, asymmetry, and distribution of amplitude values, are typically difficult or impossible to detect from the frequency spectrum but are readily apparent from an analysis of the time waveform and when combined with spectral analysis significantly enhance the accuracy of fault diagnosis.

While the above discussion has focused on the invention embodied in a field data collector 16, the invention is also useful in other forms, such as in a desktop or portable laptop computer. That is, if time waveform data is provided to a base computer by whatever means, it is useful to provide the capability of performing time waveform analysis based on one or more of a plurality of time waveform parameter calculations. The time savings and improvements in analysis accuracy derived from these particular techniques of analyzing the time waveform are also useful in the computer workstation alone, without regard to other aspects of the invention.

It is contemplated, and will be apparent to those skilled in the art from the foregoing specification, drawings, and examples that modifications and/or changes may be made in the embodiments of the invention. Accordingly, it is expressly intended that the foregoing are illustrative of preferred embodiments only, not limiting thereto, and that the true spirit and scope of the present invention be determined by reference to the appended claims.

What is claimed is:

1. A machine vibration analysis system for analyzing vibration data measured from a machine, the system comprising:
    a data processor having:
        (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a peaks/points ratio; and
        (b) a comparator for comparing said one or more selected time waveform parameters, including said peaks/points ratio, to one or more predetermined criteria, and producing an alarm when said criteria is met.

2. A machine vibration analysis system for analyzing vibration data measured from a machine, the system comprising:
    a data processor having:
        (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a zero crossings/points ratio; and
        (b) a comparator for comparing said one or more selected time waveform parameters, including said zero crossings/points ratio, to one or more predetermined criteria, and producing an alarm when said criteria is met.

3. A machine vibration analysis system for analyzing vibration data measured from a machine, the system comprising:
    a data processor having:
        (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a symmetry factor; and
        (b) a comparator for comparing said one or more selected time waveform parameters, including said symmetry factor, to one or more predetermined criteria, and producing an alarm when said criteria is met.

4. A machine vibration analysis system for analyzing vibration data measured from a machine, the system comprising:
    a data processor having:
        (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a Gaussian distribution of peaks within the digital time domain waveform; and
        (b) a comparator for comparing said one or more selected time waveform parameter to one or more predetermined criteria, and producing an alarm when said criteria is met, said comparator including a distribution comparator for comparing the Gaussian distribution to predetermined criteria in the form of a normal distribution of peaks.

5. A machine vibration analysis system for analyzing vibration data measured from a machine, the system comprising:
    a data processor having:
        (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes an impact parameter A defined by the equation:

$$\text{IMPACT PARAMETER } A = \frac{\frac{\sum_{i=1}^{4} M_i}{4}}{\frac{\sum_{i=1}^{n} |X_i|}{n}}$$

where:
    $M_i$ represents the amplitude associated with a maximum impact occurring within a sample period of time;
    $X_i$ represents the amplitude associated with an impact occurring within the same sample time period; and
    n represents the total number of impacts occurring within the sample time period; and
        (b) a comparator for comparing said one or more selected time waveform parameters, including said impact parameter A, to one or more predetermined criteria, and producing an alarm when said criteria is met.

6. A machine vibration analysis system for analyzing vibration data measured from a machine, the system comprising:

a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes an impact parameter B defined by the equation:

$$\text{IMPACT PARAMETER } B = \frac{\left[\frac{\sum_{i=1}^{4} M_i}{4}\right]^2 \left[\frac{\sum_{i=1}^{n} |X_i|}{n}\right]^{-1}}{\left[\frac{\sum_{i=1}^{4} M_i}{4}\right] + \left[\frac{\sum_{i=1}^{4} M_i}{4}\right] \left[\frac{\sum_{i=1}^{n} |X_i|}{n}\right]^{-1}}$$

where:
  $M_i$ represents the amplitude associated with a maximum impact occurring within a sample period of time;
  $X_i$ represents the amplitude associated with an impact occurring within the same sample time period; and
  n represents the total number of impacts occurring within sample time period; and
  (b) a comparator for comparing said one or more selected time waveform parameters, including said impact parameter B, to one or more predetermined criteria, and producing an alarm when said criteria is met.

7. A machine vibration analysis system for analyzing vibration data measured from a machine, the system comprising:
a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a maximum jerk parameter defined by the equation:

$$\text{Max}\left[\frac{|X_n - X_{n-1}| + |X_{n+1} - X_n|}{T_{n+1} - T_{n-1}}\right]$$

where:
  $T_i$ represents time at which sample $X_i$ was acquired;
  $X_i$ represents the amplitude associated with an impact occurring within the same sample time period;
  n represents the total number of impacts occurring within sample time period; and $(X_n - X_{n-1})(X_{n+1} - X_n) < 0$; and (b) a comparator for comparing said one or more selected time waveform parameters, including said maximum jerk parameter, to one or more predetermined criteria, and producing an alarm when said criteria is met.

8. A machine vibration analysis system for analyzing vibration data measured from a machine, the system comprising:
a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a bearing looseness parameter defined by the equation:

$$\frac{\frac{\sum_{i=1}^{4} M_i}{4}}{\frac{\sum_{i=2}^{n} |X_i - X_{i-1}|}{\frac{T_i - T_{i-1}}{n-1}}}$$

where:
  $T_i$ represents time at which sample $X_i$ was acquired;
  $M_i$ represents the amplitude associated with a maximum impact occurring within a sample period of time;
  $X_i$ represents the amplitude associated with an impact occurring within the same sample time period; and
  n represents the total number of impacts occurring within sample time period; and
  (b) a comparator for comparing said one or more selected time waveform parameters, including said bearing looseness parameter, to one or more predetermined criteria, and producing an alarm when said criteria is met.

9. A machine vibration analysis system for analyzing vibration data measured from a machine, the system comprising:
a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes an off-center rotation parameter defined by the equation:

$$\text{Max} \lfloor C_j - \overline{X} \rfloor$$

where:
  $X_i$ represents the amplitude associated with an impact occurring within the same sample time period;
  n represents the total number of impacts occurring within sample time period; and $$\overline{X} = \frac{\sum_{i=1}^{n} X_i}{n} \text{ and } C_j = \frac{\sum_{i=1}^{10} X_{i-j}}{10} \text{ for } j = \frac{n}{10}$$

and (b) a comparator for comparing said one or more selected time waveform parameters, including said off-center rotation parameter, to one or more predetermined criteria, and producing an alarm when said criteria is met.

10. A machine vibration analysis system for analyzing vibration data measured from a machine, the system comprising:

a data processor having:
(a) an analyzer having a plurality of stored routines for calculating a plurality of time waveform parameter, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a sinusoidal parameter A defined by the equation:

$$\sum_{i=2}^{\frac{n}{10}} \left| \frac{C_i + C_{i-1}}{2} \right| \cdot \Delta$$

where $C_i$ is given by the equation:

$$C_i = \frac{\sum_{i=1}^{10} X_i}{10}$$

and where:

$\Delta$ represents the sampling interval between two consecutive points $(T_i - T_{i-1})$;

$X_i$ represents the amplitude associated with an impact occurring within the same sample time period; and n represents the total number of impacts occurring within sample time period, and (b) a comparator for comparing said one or more selected time waveform parameters, including said sinusoidal parameter A, to one or more predetermined criteria, and producing an alarm when said criteria is met.

11. A machine vibration analysis system for analyzing vibration data measured from a machine, the system comprising:

a data processor having:
(a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a sinusoidal parameter B defined by the equation:

$$\frac{\sum_{i=2}^{\frac{n}{10}} \left| \frac{C_i + C_{i-1}}{2} \right| \cdot \Delta - \text{Max}[C_j - \overline{X}] \cdot 8}{\sum_{i=w}^{\frac{n}{10}} \left| \frac{C_i + C_{i-1}}{2} \right| \cdot \Delta + 8 \cdot \text{Max}[C_j - \overline{X}]}$$

where:

$$\overline{X} = \frac{\sum_{i=1}^{n} X_i}{n}, C_j = \frac{\sum_{i=1}^{10} X_{i-j}}{10}, \text{ and } C_i = \frac{\sum_{i=1}^{10} X_i}{10}, \text{ for } j = \frac{n}{10}$$

and where:

$\Delta$ represents the sampling interval between two consecutive points $(T_i - T_{i-1})$;

$X_i$ represents the amplitude associated with an impact occurring within the same sample time period; and n represents the total number of impacts occurring within sample time period; and (b) a comparator for comparing said one or more selected time waveform parameters, including said sinusoidal parameter B, to one or more predetermined criteria, and producing an alarm when said criteria is met.

12. A machine vibration analysis system for analyzing vibration data measured from a machine, the system comprising:

a data processor having:
(a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a sinusoidal parameter C; and (b) a comparator for comparing said one or more selected time waveform parameters, including said sinusoidal parameter C, to one or more predetermined criteria, and producing an alarm when said criteria is met.

13. A machine vibration analysis system for analyzing vibration data measured from a machine, the system comprising:

a data processor having:
(a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a DC drift parameter; and (b) a comparator for comparing said one or more selected time waveform parameters, including said DC drift parameter, to one or more predetermined criteria, and producing an alarm when said criteria is met.

14. A machine vibration analysis system for analyzing vibration data measured from a machine, the system comprising:

a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a peak symmetry parameter; and
  (b) a comparator for comparing said one or more selected time waveform parameters, including said peak symmetry parameter, to one or more predetermined criteria, and producing an alarm when said criteria is met.

15. A machine vibration analysis system for analyzing vibration data measured from a machine, the system comprising:
a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes an absolute symmetry parameter; and
  (b) a comparator for comparing said one or more selected time waveform parameters, including said absolute symmetry parameter, to one or more predetermined criteria, and producing an alarm when said criteria is met.

16. A machine vibration analysis system for analyzing vibration data measured from a machine, the system comprising:
a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a shape symmetry parameter; and
  (b) a comparator for comparing said one or more selected time waveform parameters, including said shape symmetry parameter, to one or more predetermined criteria, and producing an alarm when said criteria is met.

17. A machine vibration analysis system for analyzing vibration data measured from a machine, the system comprising:
a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a skewness parameter; and
  (b) a comparator for comparing said one or more selected time waveform parameters, including said skewness parameter, to one or more predetermined criteria, and producing an alarm when said criteria is met.

18. A machine vibration analysis system for analyzing vibration data measured from a machine, the system comprising:
a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a nonsynchronous residual parameter; and
  (b) a comparator for comparing said one or more selected time waveform parameters, including said nonsynchronous residual parameter, to one or more predetermined criteria, and producing an alarm when said criteria is met.

19. A machine vibration analysis system for analyzing vibration data measured from a machine, the system comprising:
a data processor having:
  (a) an analyzer having a plurality of stored routines for calculating a plurality of time waveform parameters, said analyzer being operational to analyze a digital time domain waveform measured from a machine by selecting one or more of the routines and calculating one or more selected time waveform parameters that are measures of time waveform behaviors characteristic of fault modes of the machine being monitored, wherein said one or more selected time waveform parameters includes a synchronous residual parameter; and
  (b) a comparator for comparing said one or more selected time waveform parameters, including said synchronous residual parameter, to one or more predetermined criteria, and producing an alarm when said criteria is met.

20. A vibration data analysis system for analyzing a specified set of waveform parameters that are measures of waveform behaviors characteristic of fault modes of the machine being monitored, the system comprising:
a data processor having:
  (a) an analyzer for analyzing the digital time domain vibration data to produce a plurality of time domain parameters for alarming;
  (b) a comparator for comparing at least one of the plurality of time domain parameters to one or more predetermined criteria, and producing an alarm when said criteria is met; and
  (c) programmable control means for storing vibration data and for determining, based on an analysis of the digital time domain vibration data:
    (i) when vibration data will be stored; and
    (ii) if vibration data is stored, what type of vibration data will be stored.

21. A method of collecting, analyzing, and storing vibration data generated by a machine, the method comprising the steps of:

producing an analog vibration signal in the form of a time domain waveform having positive peaks, negative peaks, and DC and sinusoidal components, said time domain waveform corresponding to vibrations generated by the machine;

conditioning the time domain waveform to produce a conditioned time domain waveform;

digitizing the conditioned time domain waveform to produce a first digital waveform of machine vibrations in the time domain;

analyzing the first digital waveform by:
providing a plurality of routines for calculating a plurality of time domain waveform parameters;
selecting one or more routines from said plurality of routines to produce one or more selected routines;
calculating one or more time waveform parameters from said one or more selected routines to produce one or more selected time waveform parameters for alarming, said one or more selected time waveform parameters being measures of time waveform behaviors characteristic of fault modes of the machine being monitored;
determining one or more criteria corresponding to said one or more selected time waveform parameters;
comparing said criteria to said one or more selected time waveform parameters; and
producing an alarm when said one or more selected time waveform parameters meets said one or more criteria;

producing a second digital waveform different than said first digital waveform;

transforming the second digital waveform to the frequency domain to produce a frequency spectrum;

analyzing the frequency spectrum; and storing vibration data when the spectrum analysis or the first digital waveform analysis indicates the likely presence of a machine fault.

22. A method of collecting, analyzing, and storing vibration data generated by a machine, the method comprising the steps of:

producing an analog vibration signal in the form of a time domain waveform having positive peaks, negative peaks, and DC and sinusoidal components, said time domain waveform corresponding to vibrations generated by the machine;

conditioning the time domain waveform to produce a conditioned time domain waveform;

digitizing the conditioned time domain waveform to produce a first digital waveform of machine vibrations in the time domain;

analyzing the first digital waveform by:
determining a plurality of waveform parameters of the first digital time domain waveform that measure behaviors in the waveform associated with machinery faults or data acquisition errors;
determining one or more criteria corresponding to said plurality of parameters;
comparing said criteria to each specific waveform parameter; and
producing an alarm when said at least one parameter meets said one or more criteria;

producing a second digital waveform different than said first digital waveform;

transforming the second digital waveform to the frequency domain to produce a frequency spectrum;

selecting one of the first and second digital waveforms to define a selected waveform; and storing the selected waveform when two or more alarms are produced.

23. A method of collecting, analyzing, and storing vibration data generated by a machine, the method comprising the steps of:

producing an analog vibration signal in the form of a time domain waveform having positive peaks, negative peaks, and DC and sinusoidal components, said time domain waveform corresponding to vibrations generated by the machine;

conditioning the time domain waveform to produce a conditioned time domain waveform;

digitizing the conditioned time domain waveform to produce a first digital waveform of machine vibrations in the time domain;

analyzing the first digital waveform by:
determining a plurality of waveform parameters of the first digital time domain waveform that measure behaviors in the waveform associated with machinery faults or data acquisition errors;
determining one or more criteria corresponding to said plurality of parameters;
comparing said criteria to each specific waveform parameter; and
producing an alarm when said at least one parameter meets said one or more criteria;

when an alarm is produced, transforming the digital time domain waveform to the frequency domain to produce a frequency spectrum;

analyzing the frequency spectrum; and storing vibration data when the spectrum analysis indicates the likely presence of a machine fault.

24. A machine vibration analysis system for analyzing a digital time domain vibration waveform measured from a machine, the system comprising:

a data processor having:
(a) an analyzer having a plurality of stored routines for calculating a plurality of time waveform parameters corresponding to a plurality of waveform behaviors, said analyzer being operational to analyze a digital time domain vibration waveform measured from a machine by selecting two or more routines and calculating two or more time waveform parameters corresponding to two or more time waveform behaviors, wherein said two or more selected time waveform behaviors are selected from the group consisting of spiking, symmetry, repetitiveness/randomness, discontinuities, drifts, sinusoidal content, and changes in amplitude probability density; and
(b) a comparator for comparing said two or more selected time waveform parameters to predetermined criteria, and producing an alarm when said criteria is met.

* * * * *